(12) United States Patent
Miyazawa et al.

(10) Patent No.: US 6,409,935 B1
(45) Date of Patent: Jun. 25, 2002

(54) FULLERENE-ADDED LEAD ZIRCONATE TITANATE AND METHOD OF PRODUCING THE SAME

(75) Inventors: Kun-ichi Miyazawa; Kunio Ito, both of Tokyo; Toru Kuzumaki, Kawasaki; Fumie Seki, Kunitachi, all of (JP)

(73) Assignee: Tokyo, The University of, Tokyo (JP)

( * ) Notice: Subject to any disclaimer, the term of this patent is extended or adjusted under 35 U.S.C. 154(b) by 0 days.

(21) Appl. No.: 09/510,056

(22) Filed: Feb. 22, 2000

(30) Foreign Application Priority Data

Mar. 25, 1999 (JP) ............................................. 11-081100

(51) Int. Cl.[7] ........................ C04B 35/48; C04B 35/00; C04B 35/491

(52) U.S. Cl. ............................... 252/62.9 PZ; 501/134; 501/135; 501/136

(58) Field of Search ................... 252/62.9 PZ; 501/134, 501/135, 136

Primary Examiner—Elizabeth D. Wood
(74) Attorney, Agent, or Firm—Burr & Brown

(57) ABSTRACT

The invention is a novel fullerene-added lead zirconate titanate and a method of producing the same, wherein zirconium alkoxide, titanium alkoxide and lead acetate are dissolved in an organic solvent with a stabilizer to form a colloidal solution or sol. The colloidal solution is added with fullerene, gelatinized, dried and fired at a relatively low temperature, for example, 400 to 500° C., whereby a perovskite phase can effectively be formed at a temperature lower than in conventional methods.

9 Claims, 9 Drawing Sheets

FULLERENE-ADDED LEAD ZIRCONATE TITANATE AND METHOD OF PRODUCING THE SAME

BACKGROUND OF THE INVENTION

1. Field of the Invention

This invention relates to a fullerene-added lead zirconate titanate and a method of producing the same.

2. Description of Related Art

As is known from the past, a thin film of lead zirconate titanate (PZT; $Pb(Zr,Ti)O_3$) is used in various products such as a piezoelectric element, a computer memory, an infrared ray sensor, a high permittivity capacitor and the like. In order to prepare the thin film of lead zirconate titanate, there is used, for example, a sol-gel method. According to the sol-gel method, the thin film is produced by forming a solution of a metallic alkoxide or the like in an organic solvent, forming a sot in this solution through hydrolysis and polymerization of a compound, applying the sol onto a substrate, and drying and firing it. In the firing, a temperature of 500–600° C. or higher is usually required for producing a perovskite type ferroelectric phase. This is disclosed, for instance, in M. Klee et al., "Deposition of Undoped and Doped $Pb(Mg,Nb)O_3$-$PbTiO_3$, Perovskite Thin Films on Pt and Conductive Oxide Electrodes by Spin-on Processing: Correlation of Growth and Electrical Properties", Science and Technology of Electroceramic Thin Films, Kluwer Academic Publishers, 1995, p.99, and K. Miyazawa et al. "Structure of Duplex Multilayer $Pb(Zr_{0.53}Ti_{0.47}O_3)$ Films Prepared by Sol-Gel Processing", J. Am. Ceram. Soc., 81(1998) p.2333.

However, the above conventional sol-gel method conducts the firing at such a high temperature, and has problems that the composition of the PZT film is shifted by diffusing a metal of an electrode formed on the substrate into the inside of the film and that a large thermal stress to peel off the PZT film is easily caused between the substrate and the PZT film. And also, when the PZT film used as a piezoelectric actuator in a microdevice is formed by the sol-gel method, such a high firing temperature results in the deterioration of the properties in the other elements or the electrode junctions incorporated into the same substrate.

SUMMARY OF THE INVENTION

The invention is to advantageously solve the above problems and to propose a novel method of producing PZT capable of effectively producing a perovskite phase at a temperature lower than the conventional one in the production of PZT through the sol-gel method as well as PZT obtained by this method.

The inventors have made various investigations in order to achieve the above object, and found that it is very effective to add a fullerene typified by $C_{60}$ as an auxiliary material to PZT sol for achieving the above-mentioned object.

The invention is based on the above-mentioned knowledge.

The invention lies in a method of producing a fullerene-added lead zirconate titanate which comprises dissolving zirconium alkoxide, titanium alkoxide and lead acetate in an organic solvent with a stabilizer to form a colloidal solution (sol), adding a fullerene thereto, gelatinizing, drying and firing them at a relatively low temperature.

In the production method according to the invention, a preferable firing temperature condition is about 400° C. to about 500° C.

And also, it is favorable that the fullerene-added lead zirconate titanate according to the invention can easily be produced when the zirconium alkoxide is zirconium tetra-n-propoxide and the titanium alkoxide is titanium tetraisopropoxide and the stabilizer is diethanolamine. Moreover, in the production according to the invention, the alkoxide as a starting material is not restricted to the aforementioned one and various alkoxides can be used in the starting material for lead zirconate titanate. Further, in the method of the invention, various alcohols and toluene are advantageously adaptable as the organic solvent.

The fullerene-added lead zirconate titanate obtained according to the invention can take various forms including not only thin film but also powder or bulk body. In the case of producing the thin film, the colloidal solution is added with the fullerene and coated onto a substrate.

In the fullerene-added lead zirconate titanate produced according to the invention, the fullerene is well dispersed in lead zirconate titanate. And also, when the thin film of the fullerene-added lead zirconate titanate according to the invention is formed on the substrate, [100] in perovskite phase is strongly oriented to obtain good ferroelectric properties. The fullerene dispersed in lead zirconate titanate contains at least one material selected from the group consisting of $C_{60}$, $C_{60}$ polymer and carbyne.

The ratio of fullerene in the fullerene-added lead zirconate titanate according to the invention is preferably about 5–30 vol %, more desirably about 10 vol %.

DESCRIPTION OF PREFERRED EMBODIMENTS

The invention will concretely be described below.

In the invention, a thin film, powder or bulk body of fullerene-containing lead zirconate titanate is produced by dissolving a ceramic precursor consisting of zirconium alkoxide, titanium alkoxide, lead acetate and the like with a stabilizer in an organic solvent such as alcohol, toluene or the like, conducting hydrolysis reaction and polycondensation reaction with a proper quantity of water to prepare a colloidal solution (sol) of an oxide ceramic, adding a fullerene typified by $C_{60}$ to the colloidal solution, and gelatinizing, drying and firing them.

The production method of the invention is described below with reference to a concrete example. In this concrete example, zirconum tetra-n-propoxide ($Zr(O-n-C_3H_7)_4$; ZNP) is used as the zirconium alkoxide, and titanium tetraisopropoxide ($Ti(iso-OC_3H_7)_4$; TIP) is used as the titanium alkoxide, and lead acetate trihydrate ($Pb(OCOCH_3)_2 \cdot 3H_2O$; LA) is used as lead acetate, and diethanolamine ($NH(C_2H_5O)_2$; DEA) is used as a stabilizer of sol, and isopropyl alcohol (($CH_3)_2CHOH$; IP) is used as an organic solvent.

(1) Preparation of PZT sol

Figure 1:
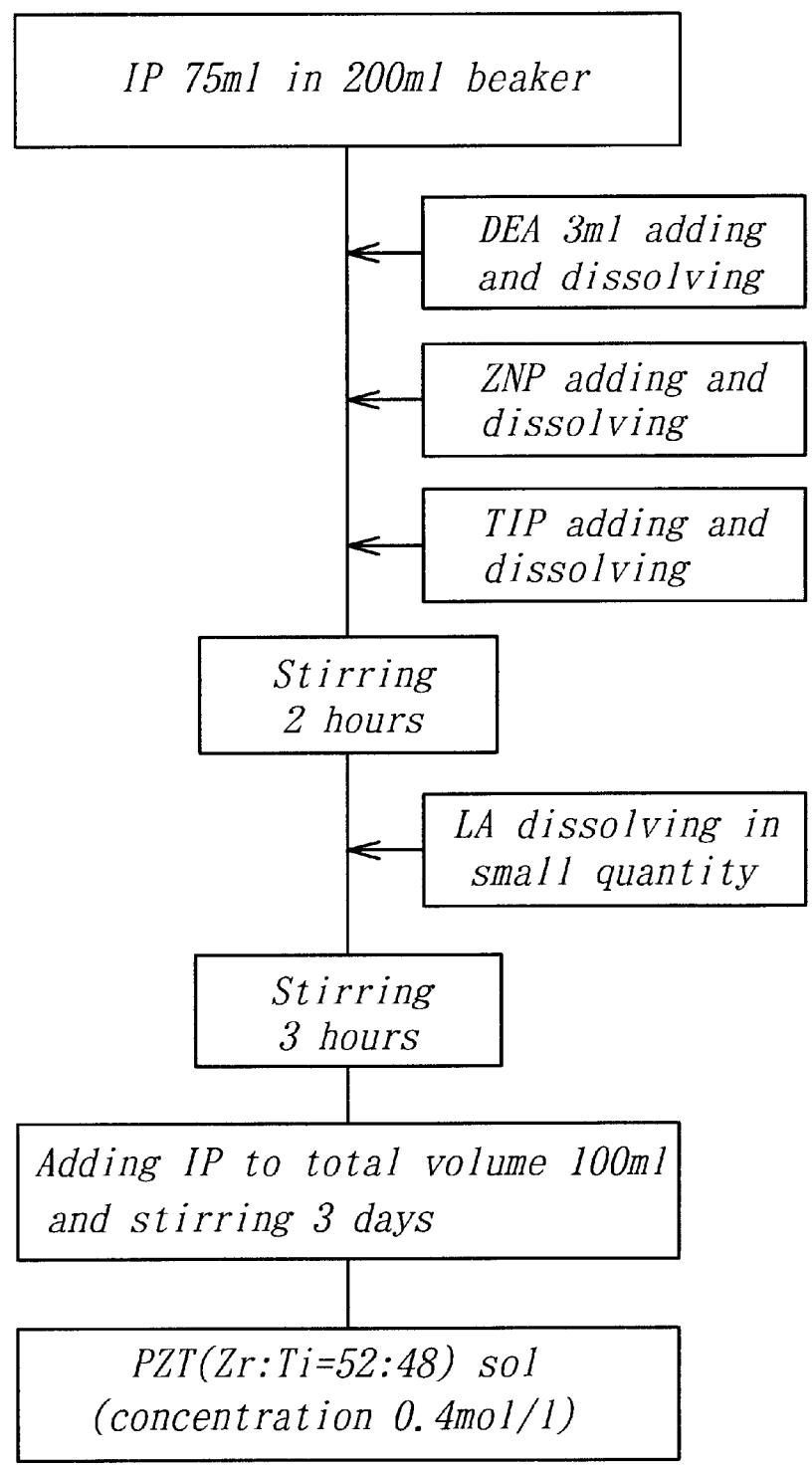
FIG. 1 is a flowchart illustrating the production process of PZT sol.

As shown in a flowchart of FIG. 1, 75 ml of isopropyl alcohol is dispensed into a beaker of 200 ml in a glove box of an argon atmosphere, and 3 ml of diethanolamine, zirconum tetra-n-propoxide and titanium tetra-isopropoxide are added and dissolved in isopropyl alcohol and stirred for 2 hours. Then, lead acetate trihydrate is added dropwise and dissolved therein and the starting is continued for 3 hours. Thereafter, isopropyl alcohol is added in a total volume of 100 ml and stirred for 3 days to obtain PZT sol.

In this example, zirconum tetra-n-propoxide is added in the form of an alcohol solution using n-propyl alcohol as a solvent. The purity of zirconum in the alcohol solution is 28.9 mass % as converted into $ZrO_2$. And also, titanium tetraisopropoxide is added in the form of an alcohol solution using isopropyl alcohol as a solvent. The purity of titanium in the alcohol solution is 99% as converted into Ti. The amounts of the starting materials added are 10.93 g of zirconum tetra-n-propoxide, 5.50 g of titanium tetraisopropoxide, and 16.69 g of lead acetate trihydrate so that the atomic ratio of elements added becomes Pb:Zr:Ti= 110:52:48. In this example, considering evaporation of Pb in the production step, the amount of Pb added is 10 at % extra than the amount required for producing 100 ml of $Pb(Zr_{0.52}Ti_{0.48})O_3$ sol. In Table 1 are shown amounts required for producing 100 ml of 0.4 M $Pb(Zr_{0.52}Ti_{0.48})O_3$.

TABLE 1

| | |
|---|---|
| LA | 16.69 g |
| ZNP | 10.93 g |
| TIP | 5.50 g |

(2) Preparation of toluene ($C_6H_5CH_3$) solution of $C_{60}$

The solubility of $C_{60}$ to toluene is 2.2 mg/ml. In this example, a saturated toluene solution of $C_{60}$ is used.

(3) Preparation of $C_{60}$-added PZT sol

Table 2 shows such a relationship between PZT sol and $C_{60}$ toluene solution that a $C_{60}$ content in $C_{60}$-added PZT solid becomes 10 vol %, 20 vol % and 30 vol %, respectively, by volume ratio.

TABLE 2

| | PZT sol:$C_{60}$ toluene solution |
|---|---|
| Addition of $C_{60}$ at 10 vol % | 1:1.4 |
| Addition of $C_{60}$ at 20 vol % | 1:3.1 |
| Addition of $C_{60}$ at 30 vol % | 1:5.3 |

Therefore, a composition of $C_{60}$-added PZT sol is adjusted so as to be a compounding recipe as shown in Table 3.

TABLE 3

| | PZT sol | $C_{60}$ toluene solution | DEA | acetic acid |
|---|---|---|---|---|
| Addition of $C_{60}$ at 10 vol % | 1 ml | 1.5 ml | 0.5 ml | 1.0 ml |
| Addition of $C_{60}$ at 20 vol % | 1 ml | 3.1 ml | 0.5 ml | 1.5 ml |
| Addition of $C_{60}$ at 30 vol % | 1 ml | 5.3 ml | 0.5 ml | 2.0 ml |

The mixing of solution for the compounding recipe shown in Table 3 is carried out at room temperature in the glove box of an argon gas atmosphere. That is, PZT sol is dispensed into a test tube, and given amounts of diethanolamine and acetic acid are added thereto and uniformly mixed under sufficient shaking. The wettability of the sol to a surface of a substrate is improved by the addition of acetic acid.

(4) Preparation of substrate

In this example is used a substrate comprised of Pt (film thickness: 150 nm)/Ti (film thickness: 50 nm)/$SiO_2$ (film thickness: 1800 nm)/Si layers. The Pt and Ti thin films are formed by sputter-coating on the oxide film of $SiO_2$ formed on the Si substrate.

(5) Firing

Figure 2:
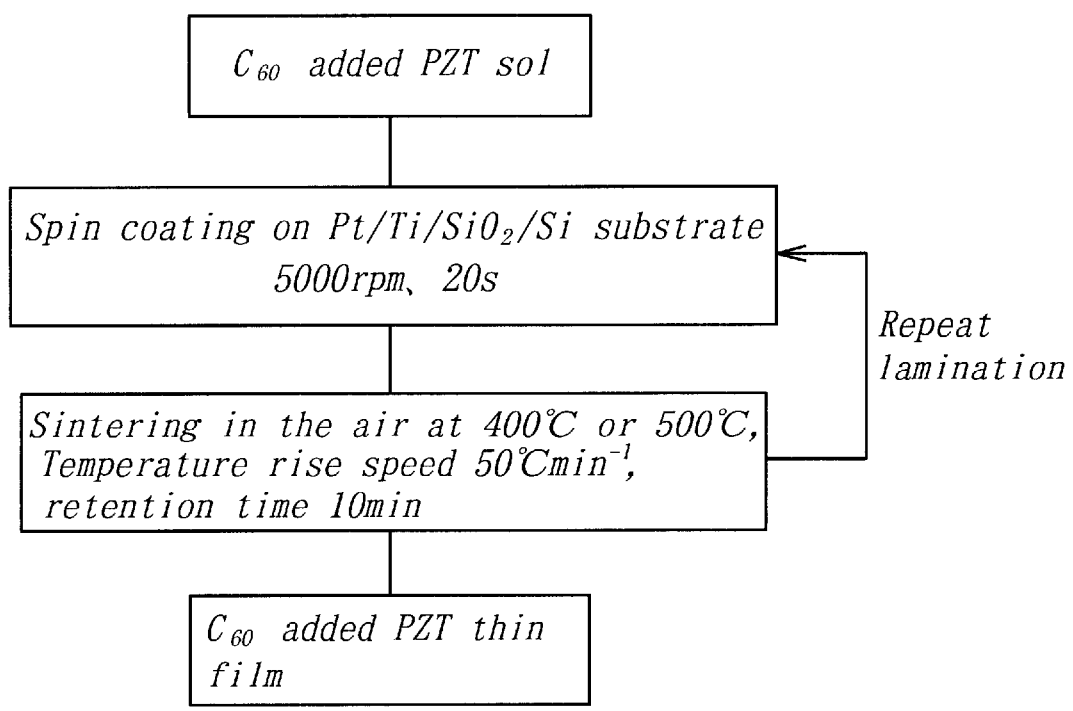
FIG. 2 is a flowchart illustrating a process of producing $C_{60}$-added PZT thin film from the sol.

In FIG. 2 is shown a flowchart of a process for coating $C_{60}$-added PZT sol to the substrate and forming $C_{60}$-added PZT thin film through firing. The $C_{60}$-added PZT sol is applied onto the above-mentioned Pt/Ti/$SiO_2$/Si substrate by spin coating under conditions of 5000 rpm and 20 seconds, and then fired. The firing conditions are a firing temperature of 400° C. or 500° C., a heating rate of 50° C./min, a retention time of 10 minutes and an atmosphere in air. Such spin coating—firing processes are repeated three times.

The analytical results of the resulting $C_{60}$-added PZT thin film are shown below.

1. X-ray Measurement

Figure 3:
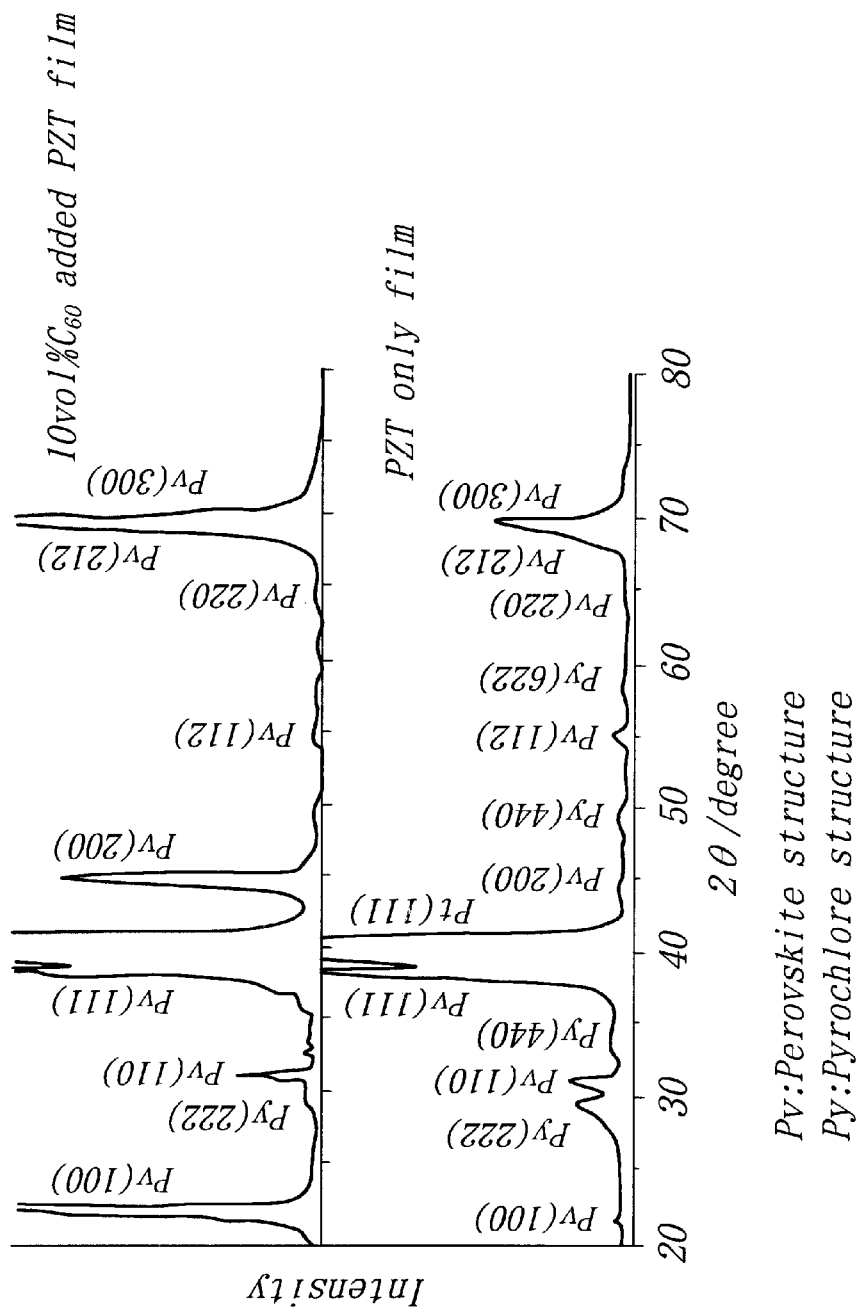
FIG. 3 is X-ray diffraction charts of PZT thin film with $C_{60}$ not added (PZT only film) and PZT thin film with 10 vol % of added $C_{60}$ (PZT-10 vol % $C_{60}$ film), respectively, when PZT sol is fired at 400° C.
Figure 4:
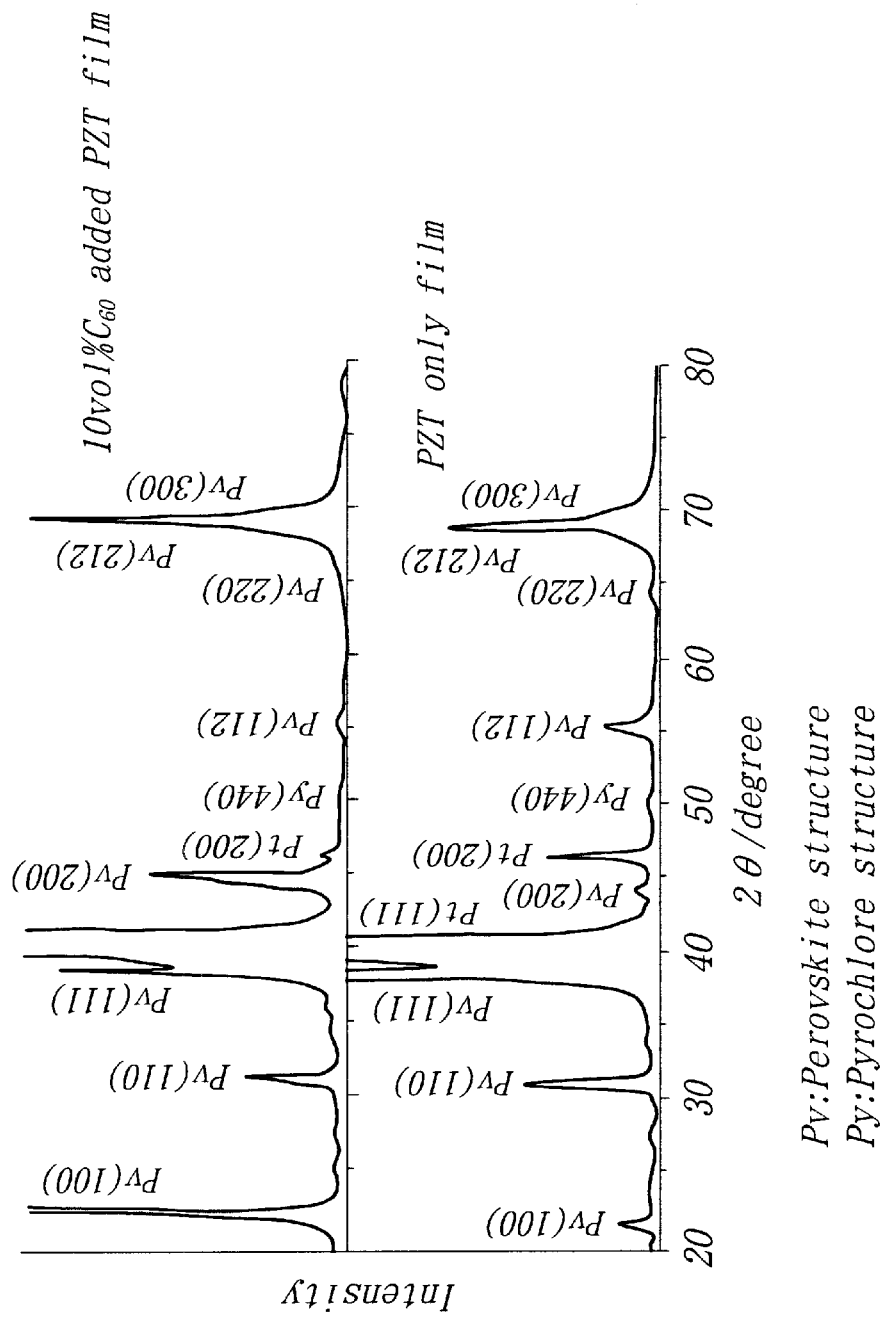
FIG. 4 is X-ray diffraction charts of PZT thin film with $C_{60}$ not added (PZT only film) and PZT thin film with 10 vol % of added $C_{60}$ (PZT-10 vol % $C_{60}$ film), respectively, when PZT sol is fired at 500° C.

In FIGS. 3 and 4 are shown X-ray diffraction charts (Cu—$K_\alpha$line, 40 kV, 200 mA) of a PZT thin film with $C_{60}$ not added (PZT only film) and a PZT thin film with 10 vol % of $C_{60}$ added (i.e. PZT-10 vol % $C_{60}$ thin film), respectively, when the PZT sol is spin-coated (5000 rpm, 20 seconds) onto the Pt/Ti/$SiO_2$/Si substrate and fired at 400° C. or 500° C. As shown in FIG. 3, in the case of firing at 400° C., a greater amount of a pyrochlore phase (Pv) is produced in the PZT only film, and hence the development of a perovskite phase (Pv) is relatively weak. On the contrary, in the PZT-10 vol % $C_{60}$ thin film, only a smaller amount of the pyrochlore phase is produced, and particularly the development of the perovskite phase oriented into [100] is remarkable.

In the case of firing at 500° C., almost all the perovskite phase is produced in the PZT only film and the [100] orientation is weak, while strong [100] orientation is generated in the PZT-10 vol % $C_{60}$ thin film.

As seen from the above results, the perovskite producing temperature is largely lowered and the [100] orientation most suitable for developing ferroelectric properties is strongly developed by the addition of $C_{60}$.

Especially, the above result that the sufficiently developed perovskite phase can be obtained at a temperature of 400° C. shows that the perovskite phase can be generated within a temperature range of about 400 to 500° C., which is lower by 200–100° C. than in conventional methods. This suggests that the addition of $C_{60}$ is very effective for producing PZT thin film at low temperature.

Figure 5:
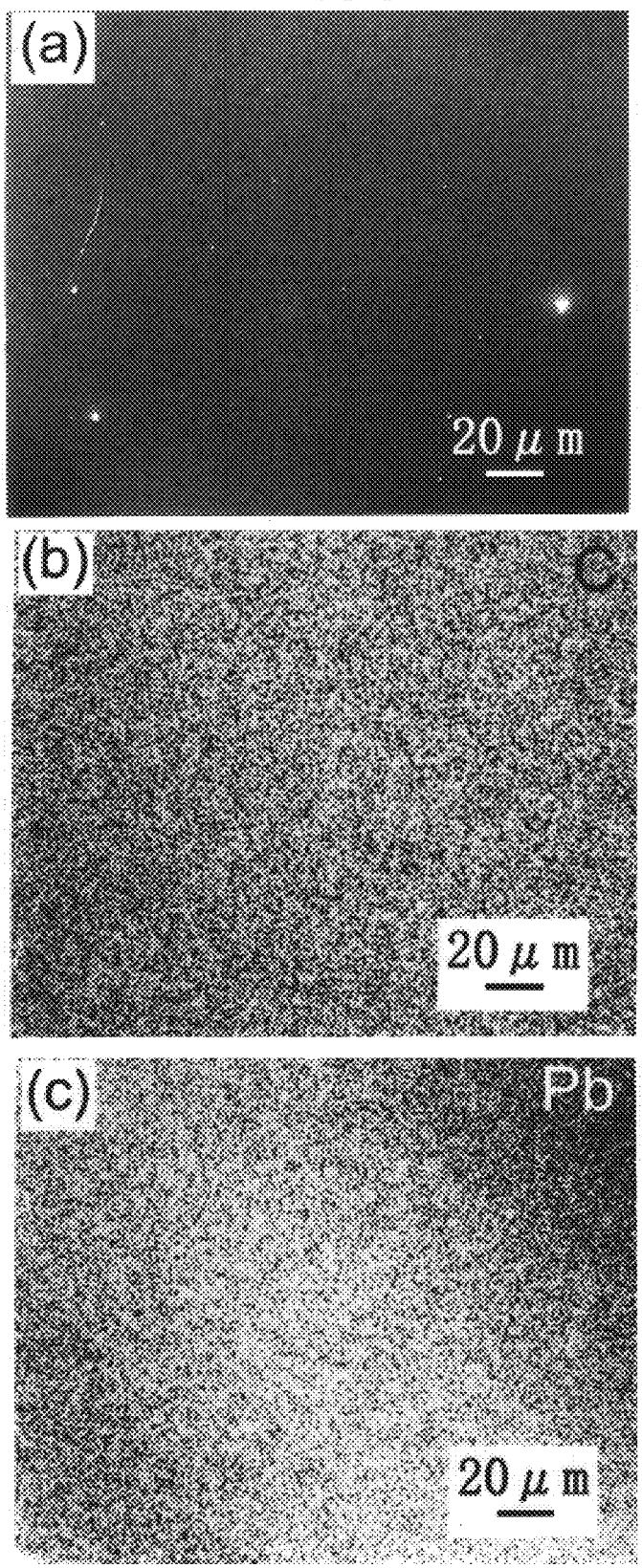
FIG. 5(a) is an SEM photograph showing a surface of PZT-10 vol % $C_{60}$ thin film fired at 400° C.
FIGS. 5(b), 5(c), 5(d) and 5(e) are photographs of C, Pb, Zr and Ti through X-ray analysis at the same position as in FIG. 5(a), respectively.
Figure 5:
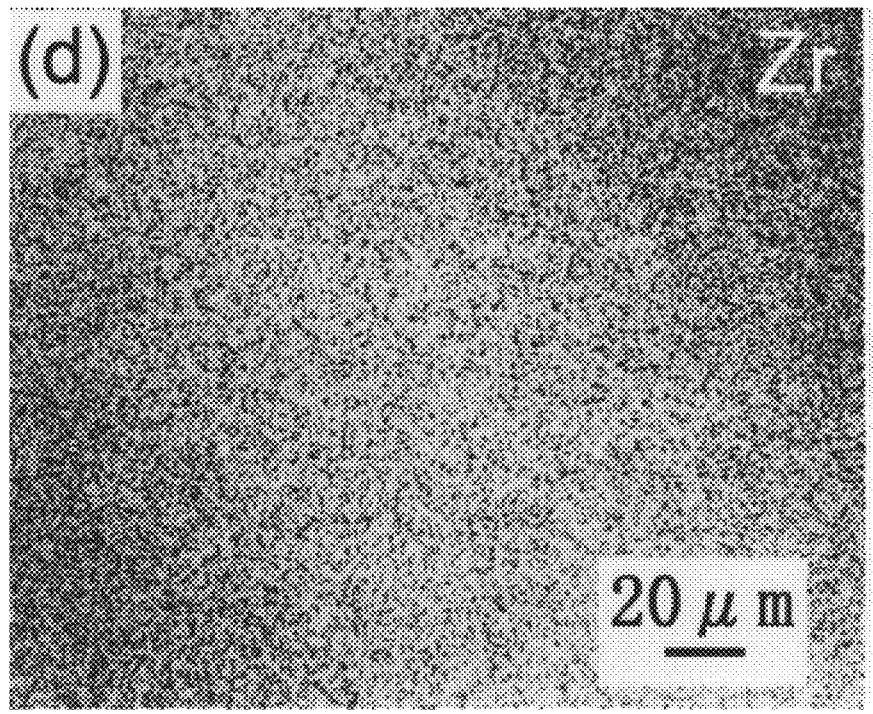
Figure 5:
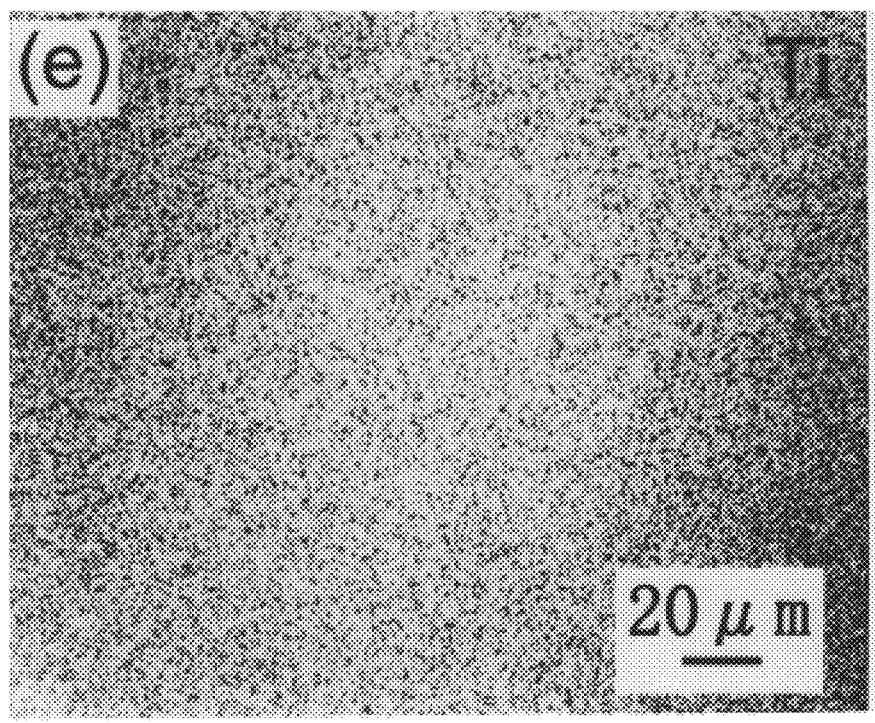

2. Surface Analysis of $C_{60}$-added PZT Thin Film In FIG. 5(a) is shown an SEM photograph of a surface of the PZT-10 vol % $C_{60}$ thin film fired at 400° C., and FIGS. 5(b), 5(c), 5(d) and 5(e) show X-ray analytical images of C, Pb, Zr and Ti at the same position as in FIG. 5(a) (FIG. 5(b) is C—$K_α$ line, FIG. 5(c) is Pb—$M_{α1}$ line, FIG. 5(d) is Zr—$L_α$ line, FIG. 5(e) is Ti—$K_α$ line), respectively. As shown in these figures, the specimen according to the invention has a smooth surface of the PZT thin film and uniform element distribution. Particularly, as shown in FIG. 5(b), carbon is uniformly distributed, from which it is understood that the $C_{60}$-added PZT sol according to the invention indicates a good wettability and an excellent $C_{60}$ dispersibility.

3. TG-DTA Analysis of $C_{60}$

Figure 6:
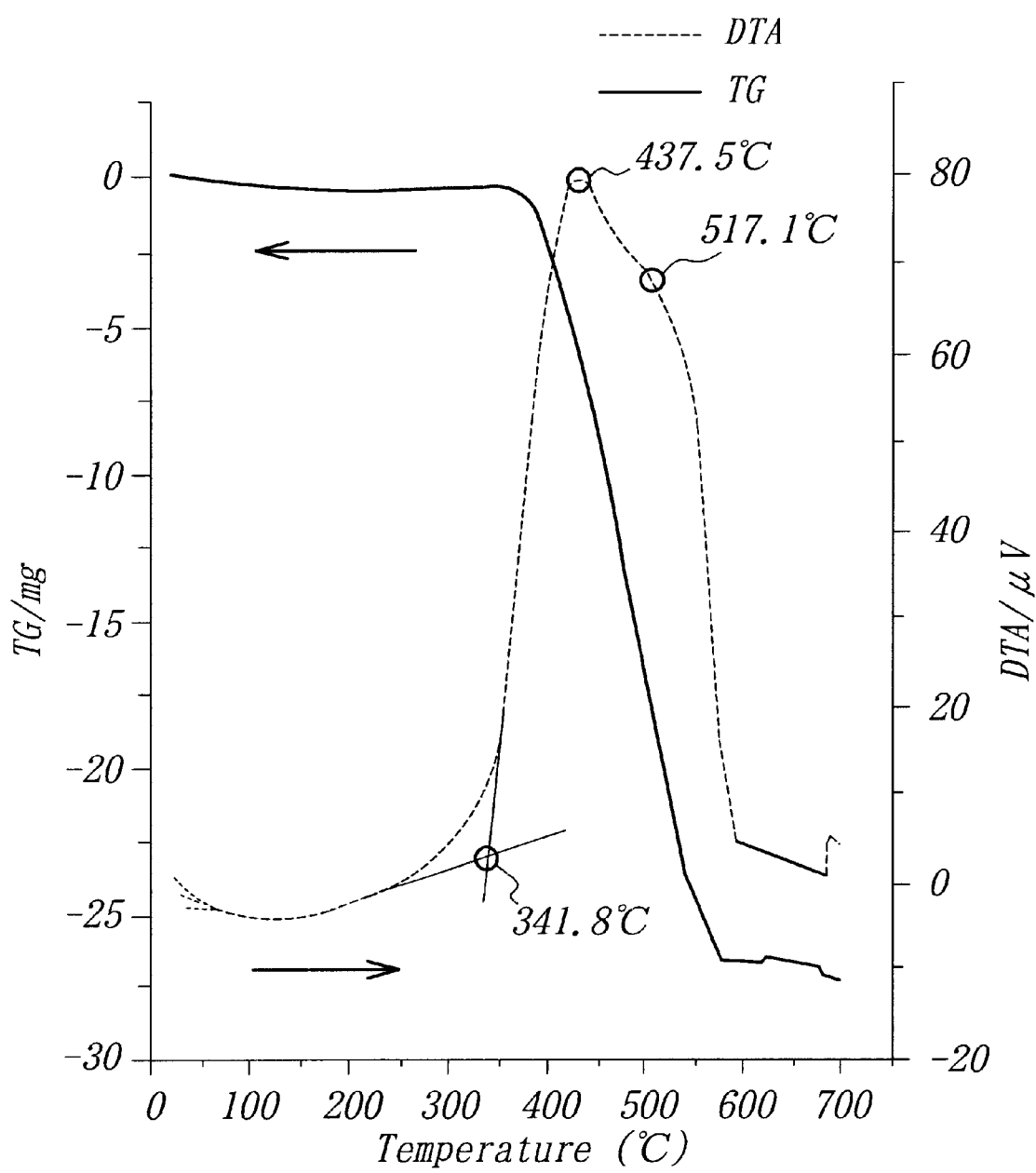
FIG. 6 is a graph showing a TG-DTA (Thermogravimetry-Differential Thermal Analysis) curve of $C_{60}$ powder when a heating rate is 1.2° C./min.
Figure 7:
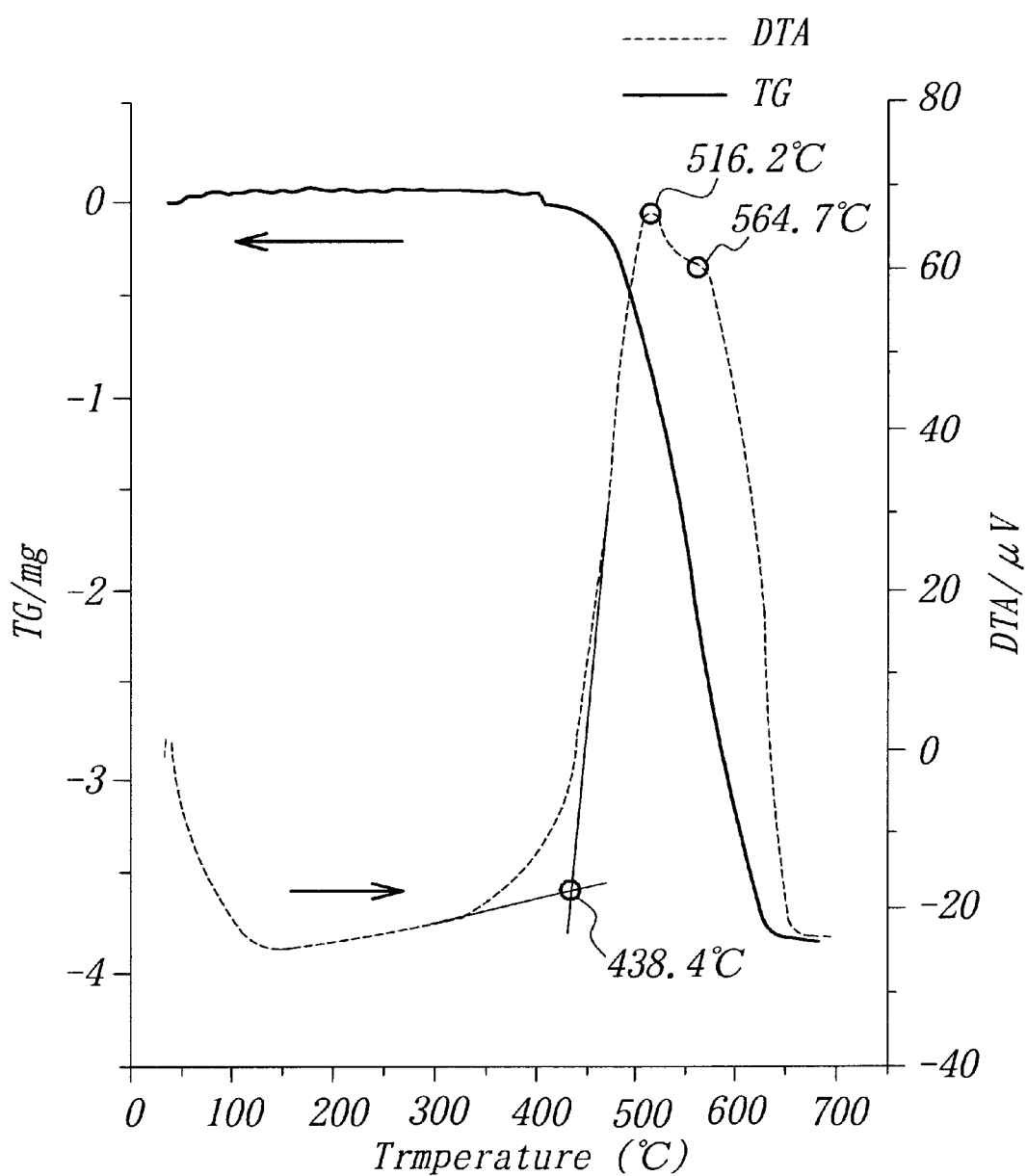
FIG. 7 is a graph showing a TG-DTA curve of $C_{60}$ powder when a heating rate is 10.0° C./min.
Figure 8:
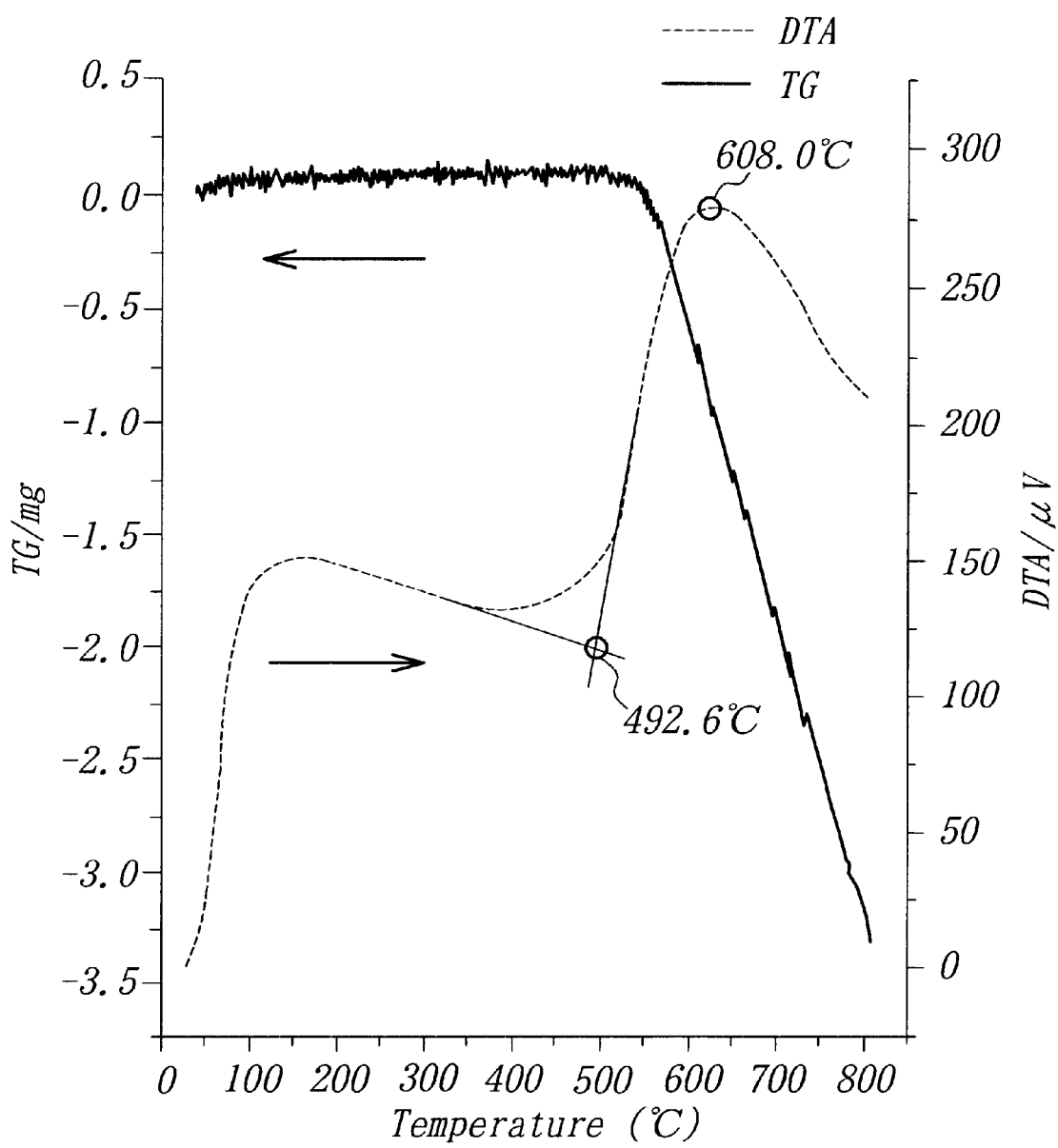
FIG. 8 is a graph showing a TG-DTA curve of $C_{60}$ powder when a heating rate is 50.0° C./min.

A differential thermogravimetric analysis is carried out in order to examine thermal stability of $C_{60}$ through heating in air. In FIGS. 6, 7 and 8 are shown TG-DTA (Thermogravimetry-differential thermal analysis) curves of $C_{60}$ powder when this powder is heated to various temperatures in air at heating rates of 1.2° C./min, 10.0° C./min and 50.0° C./min, respectively. It is understood from these figures that an exothermic peak is observed at a higher temperature area from an extrapolation beginning temperature shown by 341.8° C. in FIG. 6, 438.4° C. in FIG. 7 and 492.6° C. in FIG. 8 and at the same time the weight reduction is caused. The exothermic peak and weight reduction reflect on the oxidation of $C_{60}$. And also, it is obvious that the exothermic peak shifts to a higher temperature side as the heating rate becomes larger.

The invention, the firing of the PZT filem is carried out a heating rate of approximately 50° C./min. Therefore, it is clear from the result of FIG. 8 that when the firing is carried out at about 400–500° C. according to the invention, $C_{60}$ may be considered to be entered into the PZT film without being substantially decomposed.

The fullerene-added lead zirconate titanate according to the invention is investigated by using a high-resolution transmission electron microscope for considering reasons why the perovskite phase is fully developed to obtain lead zirconate titanate having good properties even when the fullerene-added lead zirconate titanate is fired at a temperature lower than that of the conventional technique. In this investigation is used a $C_{60}$-added PZT thin film obtained by coating PZT sol added with 30 vol % of $C_{60}$ onto a Pt/Ti/SiO$_2$/Si substrate and firing at 400° C. It is confirmed from this investigation that $C_{60}$ in the $C_{60}$-added PZT thin film can be represented by a rhombohedral system (lattice constant α: 0.901 nm, α: 57.4°) and molecules of the $C_{60}$ are polymerized to form a nano-crystal of $C_{60}$ polymer. And also, the perovskite type PZT is found adjacent to $C_{60}$.

This result shows that $C_{60}$ effectively serves as a nucleus-forming site of the perovskite phase. In addition, since $C_{60}$ has a high oxygen affinity, when it is added into the PZT film, $C_{60}$ absorbs excessive oxygen therearound to control the formation of the pyrochlore phase. This is considered to contribute to facilitating the formation of the perovskite phase.

Furthermore, mechanical strength is increased by polymerizing the $C_{60}$, so that $C_{60}$ polymerized in the PZT film is considered to contribute to the strengthening of the PZT matrix. Moreover, electric conductivity is obtained by polymerizing $C_{60}$, so that a composite of $C_{60}$ and PZT is considered to render a high permittivity PZT ceramic when the ratio of $C_{60}$ is small or a conductive PZT ceramic when the ratio of $C_{60}$ is large.

As a result of the investigation on the fullerene-added lead zirconate titanate using the above high-resolution transmission microscope, it is confirmed from the measurement of spacing between lattice planes that chaoite, which is a kind of carbyne, is also formed in the PZT thin film by the addition of $C_{60}$. Carbyne is an allotrope of carbon wherein carbon atoms one-dimensionally bond to each other and is expected to have a piezoelectric property. Therefore, it is considered that a high-performance composite piezoelectric body is obtained by adding $C_{60}$ to PZT according to the invention.

As mentioned above, according to the invention, the perovskite phase can be effectively formed at a temperature lower than the conventional one when PZT is produced by the sol-gel method. As a result, according to the invention, the problems in the conventional firing of PZT such as the composition shifting accompanied with the diffusion of substrate metal into the inside of the PZT film, peeling of the PZT film resulting from a high thermal stress, and deterioration of the properties of other elements or electrode junctions incorporated into the substrate can effectively be prevented.

The fullerene-added lead zirconate titanate according to the invention especially has a high permittivity through an effect of interfacial polarization. Therefore, it can effectively be applied as a ferroelectric body, piezoelectric body, computer memory, micro-actuator material or the like, so that the invention may be preferably used in wider fields of automobile industry, home electric appliances, computer industry and the like.

Although the invention is mainly described with respect to the case of producing the PZT thin film, it is not restricted thereto, and powders or bulk bodies can be produced in the same manner. And also, a PZT sintered body can be produced by shaping the powder and sintering it.

What is claimed is:

1. A method of producing a fullerene-added lead zirconate titanate which comprises dissolving zirconium alkoxide, titanium alkoxide and lead acetate in an organic solvent with a stabilizer to form a colloidal solution (sol), adding a fullerene thereto, gelatinizing, drying and firing.

2. The method of producing the fullerene-added lead zirconate titanate according to claim 1, wherein said firing is carried out at a temperature of from about 400° C. to about 500° C.

3. The method of producing the fullerene-added lead zirconate titanate according to claim 1, wherein the zirconium alkoxide is zirconum tetra-n-propoxide.

4. The method of producing the fullerene-added lead zirconate titanate according to claim 1, wherein the titanium alkoxide is titanium tetraisopropoxide.

5. The method of producing the fullerene-added lead zirconate titanate according to claim 1, wherein the stabilizer is diethanepamine.

6. The method of producing the erene-added lead zirconate titanate according to claim 1, wherein the fullerene-added lead zirconate titanate is a thin film made by adding the colloidal solution with the fullerene and applying to a substrate.

7. A fullerene-added lead zirconate titanate produced by dissolving zirconium alkoxide, titanium alkoxide and lead acetate in an organic solvent with a stabilizer to form a colloidal solution (sol), adding a fullerene thereto, gelatinizing, drying and firing.

8. A fullerene-added lead zirconate titanate thin film produced by dissolving zirconium alkoxide, titanium alkoxide and lead acetate in an organic solvent with a stabilizer to form a colloidal solution (sol), adding a fullerene thereto, applying the resulting solution onto a substrate, gelatinizing, drying and firing.

9. A fullerene-added lead zirconate titanate containing at least one material selected from the group consisting of $C_{60}$, $C_{60}$ polymer and carbyne.

* * * * *